(12) United States Patent
Hafermalz et al.

(10) Patent No.: US 11,459,020 B2
(45) Date of Patent: Oct. 4, 2022

(54) STEERING SYSTEMS FOR A VEHICLE

(71) Applicant: Robert Bosch GmbH, Stuttgart (DE)

(72) Inventors: Jens-Uwe Hafermalz, Waeschenbeuren (DE); Ekkehard Kneer, Wendlingen (DE); Dennis Fuechsel, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 16/630,308

(22) PCT Filed: Jun. 11, 2018

(86) PCT No.: PCT/EP2018/065324
§ 371 (c)(1),
(2) Date: Jan. 10, 2020

(87) PCT Pub. No.: WO2019/037917
PCT Pub. Date: Feb. 28, 2019

(65) Prior Publication Data
US 2020/0231201 A1    Jul. 23, 2020

(30) Foreign Application Priority Data
Aug. 21, 2017 (DE) ...................... 10 2017 214 523.4

(51) Int. Cl.
*B62D 3/12*   (2006.01)
*B62D 5/04*   (2006.01)
*F16H 1/16*   (2006.01)
*F16H 19/04*  (2006.01)

(52) U.S. Cl.
CPC ............. *B62D 3/12* (2013.01); *B62D 5/0403* (2013.01); *B62D 5/0421* (2013.01); *F16H 1/16* (2013.01); *F16H 19/04* (2013.01)

(58) Field of Classification Search
CPC ...... B62D 3/12; B62D 5/0403; B62D 5/0421; F16H 1/16; F16H 19/04
See application file for complete search history.

(56) References Cited

U.S. PATENT DOCUMENTS 6,543,569 B1 * 4/2003 Shimizu ................ B21K 1/767
                                                    180/444
2004/0065163 A1   4/2004 Takahashi et al.
(Continued)

FOREIGN PATENT DOCUMENTS

CN    1712295 A    12/2005
CN    102574541 A   7/2012
(Continued)

OTHER PUBLICATIONS

International Search Report corresponding to PCT Application No. PCT/EP2018/065324, dated Sep. 26, 2018, (German and English language document) (6 pages).
(Continued)

*Primary Examiner* — Jacob D Knutson
(74) *Attorney, Agent, or Firm* — Maginot, Moore & Beck LLP

(57) ABSTRACT

A steering system for a vehicle includes a pinion shaft which is mounted rotatably in a locating bearing and in a floating bearing, wherein both the locating bearing and the floating bearing are received in the steering housing.

10 Claims, 2 Drawing Sheets

(56) References Cited

U.S. PATENT DOCUMENTS

| | | | |
|---|---|---|---|
| 2005/0257992 A1* | 11/2005 | Shiino | B62D 5/0406 |
| | | | 180/444 |
| 2012/0233860 A1* | 9/2012 | Yoneda | B62D 5/0409 |
| | | | 29/893.1 |
| 2013/0248278 A1* | 9/2013 | Ishii | B62D 5/0421 |
| | | | 180/444 |
| 2014/0109702 A1* | 4/2014 | Kometani | B62D 3/123 |
| | | | 74/30 |
| 2014/0216183 A1* | 8/2014 | Nakayama | B62D 5/0442 |
| | | | 74/29 |
| 2015/0274198 A1* | 10/2015 | Sato | B62D 5/0421 |
| | | | 180/444 |
| 2016/0280253 A1* | 9/2016 | Ueno | B62D 3/12 |
| 2017/0341680 A1* | 11/2017 | Yano | B62D 5/0421 |

FOREIGN PATENT DOCUMENTS

| | | |
|---|---|---|
| CN | 104943740 A | 9/2015 |
| DE | 10 2010 062 577 A1 | 6/2012 |
| DE | 10 2011 084 505 A1 | 12/2012 |
| DE | 10 2011 084 510 A1 | 12/2012 |
| DE | 10 2012 103 147 A1 | 10/2013 |
| WO | 98/10971 A1 | 3/1998 |

OTHER PUBLICATIONS

Falk et al., "Metalltechnik: Fachstufe Maschinentechnische Berufe"; Beuth Publishing Company, 1985, 2nd edition, pp. 290-292, Germany.

* cited by examiner

STEERING SYSTEMS FOR A VEHICLE

This application is a 35 U.S.C. § 371 National Stage Application of PCT/EP2018/065324, filed on Jun. 11, 2018, which claims the benefit of priority to Serial No. DE 10 2017 214 523.4, filed on Aug. 21, 2017 in Germany, the disclosures of which are incorporated herein by reference in their entirety.

The disclosure relates to a steering system for a vehicle having an electric servo motor for producing a supporting servo torque, wherein the servo motor drives a pinion shaft which is rotatably supported in a fixed bearing and in a floating bearing.

BACKGROUND

There are known steering systems for vehicles having an electric servo motor for supporting the steering movement. The servo torque of the servo motor is fed via a steering gear mechanism into the steering system, wherein the steering gear mechanism converts the steering movement of a steering shaft into an actuation movement of the steerable wheels. Such a steering system is described, for example, in DE 10 2010 062 577 A1.

An object of the disclosure is, using simple structural means, to configure a steering system for a vehicle which has an electric servo motor for producing a supporting servo torque to be quiet and to have a long service-life.

This object is achieved according to the disclosure with the features set forth herein. Advantageous developments are also described in the disclosure.

SUMMARY

The steering system according to the disclosure can be used in vehicles in order to adjust the steerable wheels and is constructed as an electric power steering system in which, in order to support the steering force, a servo torque is produced by means of an electric servo motor or steering motor. The servo motor drives a pinion shaft which is rotatably supported in a housing-side fixed bearing and in a housing-side floating bearing. The fixed bearing and floating bearing are arranged axially spaced apart from each other in the housing and enable the pinion shaft, via which the supporting servo torque of the servo motor is transmitted to a toothed rack of the steering system, to be rotatably received.

The fixed bearing receives the pinion shaft in an axially secure manner and in a radial direction—with respect to the pinion shaft longitudinal axis—the floating bearing enables a radial support of the pinion shaft without axial fixing.

Both the fixed bearing and the floating bearing of the pinion shaft are received in a common steering housing which is constructed in one piece and which is a component of the steering system. The steering housing may additionally also receive the toothed rack via which the steering movement is transmitted to the steerable wheels of the vehicle.

This embodiment has various advantages. The common receiving member both of the fixed bearing and of the floating bearing in the same housing has the advantage that a radial offset between the fixed bearing and floating bearing, which could lead to a tilting of the pinion shaft, is prevented. Consequently, it is also ensured that the torque transmission from the servo motor to the pinion shaft is carried out with a high level of precision. Increased friction and noise formation which can be produced as a result of an insufficiently precise support of the pinion shaft and tilting of the pinion shaft are prevented. Since, as a result of the reduced loading of the components, the wear is reduced, the maximum possible service-life and the durability of the steering system are also improved.

A servo housing of the servo motor is connected to the steering housing. The servo housing receives the servo motor, wherein where applicable the servo housing may at the same time form the motor housing of the servo motor. The connection between the servo housing and the steering housing is preferably carried out in the region of the transition between a motor shaft of the servo housing and a screw which is driven directly by the motor shaft and which meshes with a worm wheel which is connected to the pinion shaft in a rotationally secure manner. The worm is preferably located securely on the motor shaft of the servo motor. However, it may also be advantageous to carry out the torque and movement transmission from the servo motor to the screw via an interposed clutch, wherein the servo motor drives the screw via the clutch which is in engagement with the worm wheel.

The servo housing of the servo motor and the steering housing can in a manner known per se be connected to each other, for example, screwed to each other.

It may be advantageous to arrange the servo motor in an axially parallel manner with respect to the toothed rack. Accordingly, the longitudinal axis of the servo motor and the longitudinal axis of the toothed rack extend parallel with each other. In an alternative embodiment, the longitudinal axis of the servo motor and the longitudinal axis of the toothed rack may also form an angle.

According to yet another advantageous embodiment, the steering housing also receives the screw, which is driven by the servo motor. This ensures that the screw, with respect to the worm wheel which is connected to the pinion shaft, assumes its desired position with a high level of precision and the risk of tilting and tipping of the screw with respect to the worm wheel is reduced.

According to another advantageous embodiment, the fixed bearing is arranged at the side facing the worm wheel and the floating bearing at the side of the pinion shaft facing away from the worm wheel. The fixed bearing consequently has a smaller axial spacing with respect to the worm wheel than the floating bearing which is arranged in particular adjacent to the end side of the pinion shaft and which receives it in a rotating manner. The floating bearing is located adjacent to the outer side of the steering housing and takes up less structural space than the fixed bearing so that the steering housing in the region of the structural space can be constructed to be correspondingly narrow.

However, a transposed arrangement can also be considered, in which the floating bearing is arranged adjacent to the worm wheel and the fixed bearing is arranged with greater axial spacing, in particular adjacent to the end side of the pinion shaft.

The pinion tooth arrangement on the pinion shaft is in engagement with the toothed rack tooth arrangement. At both sides of the pinion tooth arrangement, the pinion shaft is supported in a fixed or a floating bearing. The worm wheel is secured to the pinion shaft outside the bearing.

According to yet another advantageous embodiment, there is placed in a rotationally secure manner on the pinion shaft a hub which is a carrier of the worm wheel. According to another advantageous embodiment, there is supported on the hub an inner ring of the fixed bearing by an end side of the inner ring being contacted by the hub. Where applicable, between the end side of the hub and the end side of the inner ring another transmission component may be located, wherein there is preferably direct contact between the hub and the inner ring of the fixed bearing. The inner ring of the fixed bearing is pushed onto the pinion shaft and in particular connected to the pinion shaft in a rotationally secure manner.

It may be advantageous for the inner ring of the fixed bearing to be supported axially on a shaft projection of the pinion shaft at the side facing away from the hub. Consequently, the fixed bearing is supported on the inner ring axially at both sides, that is to say, at an end side on the hub and at the other end side on the shaft projection of the pinion shaft.

According to yet another advantageous embodiment, the outer ring of the fixed bearing is supported at the two end sides thereof axially either directly or indirectly on the steering housing. For example, at the side facing away from the hub, the outer ring of the fixed bearing may be supported on an internal housing projection of the steering housing. The opposing end side of the outer ring of the fixed bearing may be supported on a securing ring, which is inserted into an inner groove on the steering housing so that this end side of the outer ring is supported via the securing ring indirectly on the steering housing.

According to yet another advantageous embodiment, the steering housing is constructed to be open adjacent to the end side of the pinion shaft and in axial extension of the pinion shaft. The open construction of the steering housing at this location enables the pinion shaft to be supported axially during the assembly operation. In this instance, pressing forces are received via the support, by means of which the hub of the worm wheel is pushed onto the pinion shaft as a press-fit.

The bearing which is arranged adjacent to the open side of the steering housing may be supported on an inwardly protruding housing projection and is in particular introduced from the opposite side into the steering housing.

In an alternative embodiment, the steering housing is constructed without such an opening. The support of the pinion shaft when the hub is assembled is carried out in this instance by axially fixing the pinion shaft via a tool, for example, by a blind hole with an inner thread being introduced into an end side of the pinion shaft and a corresponding tool being screwed into the inner thread. The bearing, in particular the floating bearing, is introduced into the steering housing via the same side as the pinion shaft.

The steering system advantageously comprises the steering shaft via which the driver predetermines a desired steering angle via the steering wheel, the connection of the steering shaft to the toothed rack, which is displaceably supported in the steering housing, and the above-described components with the electrical servo motor in the servo housing and the pinion shaft in the steering housing, including the screw and worm wheel. Advantageously, the steering system also involves a sensor system, in particular for establishing the steering torque and the current steering angle.

Another aspect relates to a method for assembling an above-described steering system. In this instance, initially in a first step, the floating bearing is inserted into the steering housing via an open side. Subsequently, the fixed bearing is pushed onto the pinion shaft and the pinion shaft including the fixed bearing is inserted into the steering housing until the fixed bearing is supported on a housing projection of the steering housing. Afterwards, a securing ring for fixing the fixed bearing is inserted into the steering housing and finally in another step the pinion shaft is axially supported and the hub is fitted with the worm wheel onto the pinion shaft.

Where applicable, the hub can be fitted with the worm wheel on the pinion shaft before the pinion shaft is inserted into the steering housing.

BRIEF DESCRIPTION OF THE DRAWINGS

Other advantages and advantageous embodiments can be derived from the additional claims, the description of the Figures and the drawings, in which:

DETAILED DESCRIPTION

Figure 1:
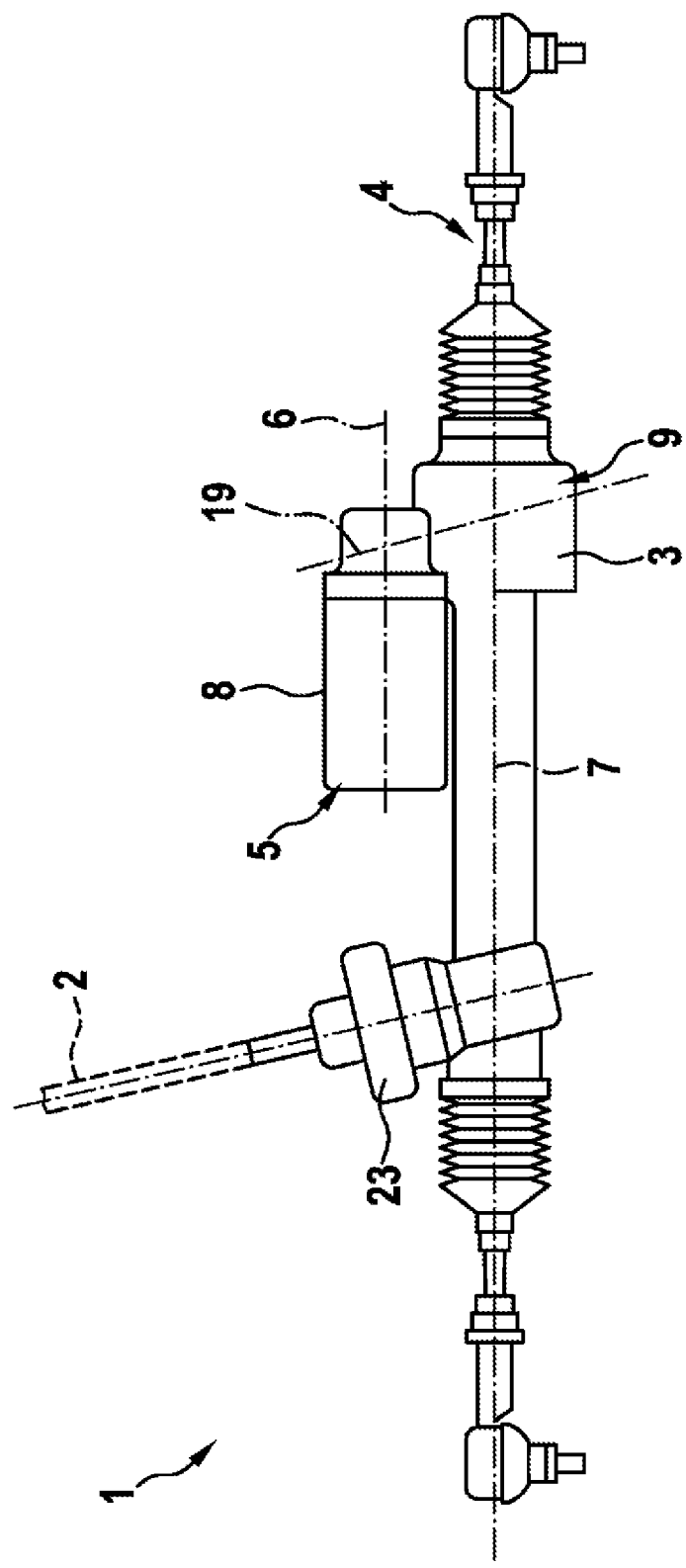
FIG. 1 is a schematic illustration of a steering system for a vehicle having an electric steering or servo motor.

In the Figures, components which are the same are provided with the same reference numerals.

FIG. 1 illustrates a steering system 1 for a vehicle by way of example. The steering system 1 comprises a steering shaft 2 via which a steering angle which is predetermined by the driver via the steering wheel is transmitted, a steering housing 3 having a steering gear mechanism which is received therein and a steering rod assembly having a toothed rack 4 via which the steering movement is transmitted to the steerable wheels of the vehicle. In order to support the manual torque applied by the driver, there is used an electric steering or servo motor 5 which produces a servo torque which is fed via a pinion shaft 9 into the steering gear mechanism in the steering housing 3. In the embodiment, the electric servo motor 5 is arranged in an axially parallel manner with respect to the toothed rack 4, the motor shaft longitudinal axis 6 of the servo motor 5 extends parallel with the longitudinal axis 7 of the toothed rack 4. The servo housing 8 in which the servo motor 5 is arranged is constructed separately from the steering housing 3, but is securely connected to the steering housing 3, for example, screwed.

A sensor system 23 is arranged between the steering shaft 2 and the steered wheels.

It is also possible for the steering shaft 2 to be connected directly to the pinion shaft 9.

The electric servo motor 5 is, for example, constructed as an electronically commutated synchronous or asynchronous motor.

Figure 2:
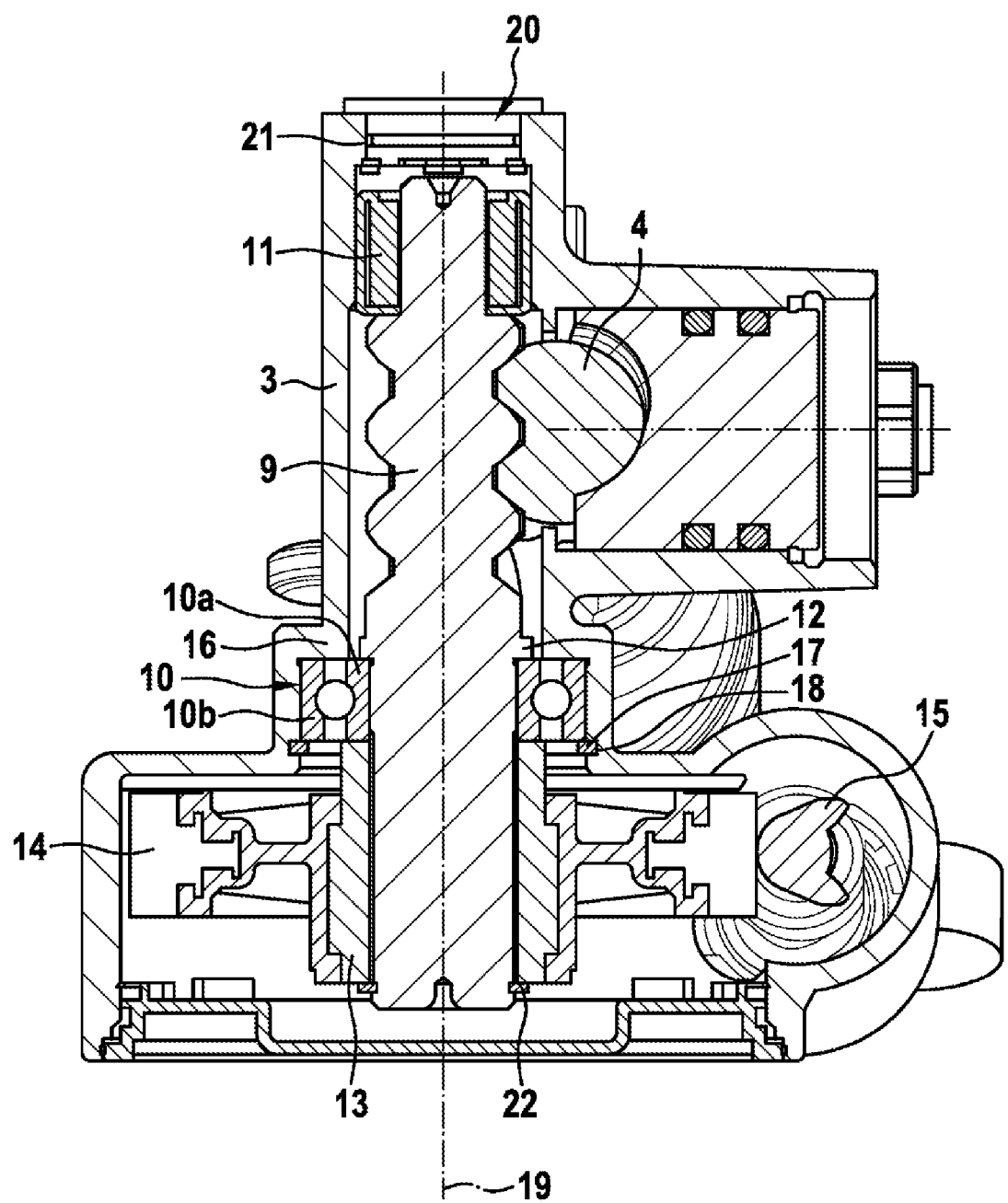
FIG. 2 shows a section through the steering housing of the steering system at the height of a pinion shaft for torque transmission from the servo motor to a toothed rack.

FIG. 2 shows a longitudinal section through the pinion shaft 9 in the steering housing 3. The pinion shaft 9 is rotatably supported in two bearings in the steering housing 3 in which a fixed bearing 10 with axial and radial fixing and a floating bearing 11 with only radial fixing of the pinion shaft 9 are involved. The fixed bearing 10 has an inner ring 10a and an outer ring 10b, wherein the inner ring 10a is positioned directly on the pinion shaft 9 and is supported with an axial end side axially on a projection 12, which is constructed integrally with the pinion shaft 9. The opposing end side of the inner ring 10a of the fixed bearing 10 is supported axially by a hub 13 which is pushed with press-fitting onto the pinion shaft 9 and which is connected in a rotationally secure manner to the pinion shaft 9. The hub 13 is a carrier of a worm wheel 14 which meshes with a screw 15 and which is driven thereby. The screw 15 which is located in a portion of the steering housing 3 is connected to the motor shaft of the electric servo motor 5 or is driven via a coupling by the motor shaft. The hub 13 may be supported axially via a securing ring 22 on the pinion shaft 9.

The outer ring 10b of the fixed bearing 10 is supported axially at one end on a housing projection 16 of the steering housing 3. At the opposing end side, the outer ring 10b is axially supported on a securing ring 17, which is inserted into an inner groove 18 in the steering housing 3.

The floating bearing 11 is located with a larger axial spacing—with respect to the longitudinal axis 19 of the pinion shaft 9—from the worm wheel 14 than the fixed bearing 10. The floating bearing 11 is located adjacent to the end side of the pinion shaft 9 in the steering housing 3. Between the fixed bearing 10 and the floating bearing 11, there is arranged the pinion tooth 25 arrangement by means of which the pinion shaft 9 is in toothed engagement with the toothed rack 4.

As a result of the fact that both the fixed bearing 10 and the floating bearing 11 of the pinion shaft are located in the steering housing 3, a precise guiding and support of the pinion shaft 9 is ensured, whereby the friction and the noise generation are reduced and a long service-life is ensured.

The steering housing 3 is, in a manner adjacent to the end side of the pinion shaft 9 on which the floating bearing 11 is arranged, provided with an opening 20, which is located in an axial extension of the pinion shaft 9. There is located adjacent to the opening 20 a radially inwardly protruding, housing-side projection 21 which reduces the free diameter of the opening 20 and which prevents the floating bearing 11 from becoming disengaged via the opening 20.

For assembly, in a first step, the floating bearing 11 is introduced into the steering housing 3 via the opening axially opposite the opening 20. Subsequently, in a next step, the pinion shaft 9 is inserted with the fixed bearing 10 placed thereon into the steering housing 3 until the outer ring 10b of the fixed bearing 10 abuts axially against the housing projection 16. In another step, the securing ring 17 is inserted into the inner groove 18 and the outer ring 10b of the fixed bearing 10 is thereby axially fixed. Subsequently, the hub 13 including the worm wheel 14 is pushed axially as a press-fit onto the pinion shaft 9 until the end side of the hub 13 abuts the inner ring 10a of the fixed bearing 10.

LIST OF REFERENCE NUMERALS

1 Steering system
2 Steering shaft
3 Steering housing
4 Toothed rack
5 Electric servo motor
6 Motor shaft longitudinal
7 Longitudinal axis
8 Servo housing
9 Pinion shaft
10 Fixed bearing
10a Inner ring
10b Outer ring
11 Floating bearing
12 Pinion shaft projection
13 Hub
14 Worm wheel
15 Screw
16 Housing projection
17 Securing ring
18 Inner groove
19 Longitudinal axis
20 Opening
21 Projection
22 Securing ring
23 Sensor system

The invention claimed is:

1. A steering system for a vehicle comprising:
a pinion shaft which is in engagement with a toothed rack and which is rotatably supported in a fixed bearing and in a floating bearing; and
an electric servo motor configured to produce a supporting servo torque and to drive the pinion shaft,
wherein both the fixed bearing and the floating bearing of the pinion shaft are received in a common steering housing which is constructed in one piece,
wherein the fixed bearing includes an inner ring that is axially supported at an end side by a hub, which is positioned on the pinion shaft and which carries a worm wheel.

2. The steering system as claimed in claim 1, wherein a screw is arranged in the common steering housing, the screw configured to be driven by the servo motor and meshing with the worm wheel.

3. The steering system as claimed in claim 2, wherein a servo housing of the servo motor is connected to the steering housing in a transition between a motor shaft of the servo motor and the screw.

4. The steering system as claimed in claim 1, wherein the fixed bearing is arranged at a first side of the pinion shaft facing toward the worm wheel and the floating bearing is arranged at a second side of the pinion shaft facing away from the worm wheel.

5. The steering system as claimed in claim 1, wherein the inner ring of the fixed bearing is axially supported at an opposite end side on a shaft projection of the pinion shaft.

6. The steering system as claimed in claim 1, wherein the fixed bearing includes an outer ring having two end sides, the outer ring being axially supported at the two end sides directly or indirectly on the steering housing.

7. The steering system as claimed in claim 6, wherein a first end side of the two end sides of the outer ring is supported on a securing ring that is inserted into an inner groove on the steering housing.

8. The steering system as claimed in claim 1, wherein the pinion shaft has a pinion shaft end side, and the steering housing is constructed so as to be open adjacent to the pinion shaft end side and in axial extension of the pinion shaft.

9. A method for assembling a steering system for a vehicle, the method comprising:
inserting a floating bearing into a common steering housing that is constructed in one piece;
pushing a fixed bearing onto a pinion shaft;
after pushing the fixed bearing and inserting the floating bearing, inserting the pinion shaft into the common steering housing such that both the fixed bearing and the floating bearing are received in the common steering housing;
after inserting the pinion shaft, inserting a securing ring to fix the fixed bearing; and
fitting a hub with a worm wheel onto the pinion shaft such that the hub axially supports an inner ring of the fixed bearing at an end side,
wherein the pinion shaft is configured to be driven by an electric servo motor that is configured to produce a supporting servo torque.

10. The method of claim 9, wherein pushing the fixed bearing onto the pinion shaft comprises:

pushing an inner ring of the fixed bearing against a shaft projection of the pinion shaft.

* * * * *